(12) United States Patent
Fan et al.

(10) Patent No.: US 10,907,004 B2
(45) Date of Patent: Feb. 2, 2021

(54) WATERBORNE POLYURETHANE AND PREPARATION METHOD THEREOF

(71) Applicant: INDUSTRIAL TECHNOLOGY RESEARCH INSTITUTE, Hsinchu (TW)

(72) Inventors: Hsu-Tzu Fan, Taoyuan (TW); Su-Mei Chen Wei, Hsinchu (TW); Yi-Che Su, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 217 days.

(21) Appl. No.: 16/235,150

(22) Filed: Dec. 28, 2018

(65) Prior Publication Data

US 2020/0207907 A1    Jul. 2, 2020

(51) Int. Cl.

| | |
|---|---|
| *C08G 18/58* | (2006.01) |
| *C08G 18/48* | (2006.01) |
| *C08G 18/42* | (2006.01) |
| *C08G 18/34* | (2006.01) |
| *C09J 175/08* | (2006.01) |
| *C08G 18/66* | (2006.01) |
| *C08G 18/75* | (2006.01) |
| *C08G 18/40* | (2006.01) |

(52) U.S. Cl.
CPC ........... *C08G 18/58* (2013.01); *C08G 18/348* (2013.01); *C08G 18/4045* (2013.01); *C08G 18/42* (2013.01); *C08G 18/4829* (2013.01); *C08G 18/6692* (2013.01); *C08G 18/755* (2013.01); *C08G 18/758* (2013.01); *C09J 175/08* (2013.01)

(58) Field of Classification Search
CPC .. C08G 18/348; C08G 18/4045; C08G 18/42; C08G 18/4829; C08G 18/58; C08G 18/48; C08G 18/6407; C08G 18/6692; C08G 18/755; C08G 18/758; C09J 175/08

See application file for complete search history.

(56) References Cited

U.S. PATENT DOCUMENTS

| | | | |
|---|---|---|---|
| 6,602,972 B1 | 8/2003 | Schwarte et al. | |
| 6,635,723 B1 * | 10/2003 | Maier | C03C 17/322 |
| | | | 524/591 |
| 2011/0288204 A1 | 11/2011 | Grablowitz et al. | |
| 2012/0250268 A1 | 10/2012 | Ito et al. | |

FOREIGN PATENT DOCUMENTS

| | | |
|---|---|---|
| CN | 1355268 A | 6/2002 |
| CN | 1438257 A | 8/2003 |
| CN | 1629245 A | 6/2005 |
| CN | 101696262 A | 4/2010 |
| CN | 103666344 A | 3/2014 |
| CN | 104278530 A * | 1/2015 |
| CN | 104845575 A | 8/2015 |
| CN | 105131892 A | 12/2015 |
| CN | 104277755 B | 8/2016 |
| CN | 106221647 A | 12/2016 |
| CN | 108221660 A | 12/2016 |
| CN | 107353394 A | 11/2017 |
| JP | 2004-43519 A | 2/2004 |
| TW | 200808545 A | 2/2008 |
| TW | I384002 B1 | 2/2013 |
| WO | WO 01/34674 A1 | 5/2001 |

OTHER PUBLICATIONS

English Machine Translation of CN104278530, prepared Sep. 27, 2020. (Year: 2020).*
Taiwanese Office Action and Search Report, dated Mar. 9, 2020, for Taiwanese Application No. 107147643.

* cited by examiner

*Primary Examiner* — Christopher M Rodd
(74) *Attorney, Agent, or Firm* — Birch, Stewart, Kolasch & Birch, LLP

(57) ABSTRACT

A waterborne polyurethane is provided. The waterborne polyurethane is formed by mixing a polyol, a diisocyanate, a dimethylol alkyl acid, and an epoxy resin into a mixture, and polymerizing the mixture. When the usage amount of the epoxy resin used is 1 part by weight, the usage amount of the polyol is 3 to 30 parts by weight, the usage amount of the diisocyanate is 1 to 10 parts by weight, and the usage amount of the dimethylol alkyl acid is 0.1-3.0 parts by weight. The epoxy resin includes an epoxy resin having a cyclic structure, a triacylglycerol having an epoxy group, or a combination thereof.

12 Claims, No Drawings

WATERBORNE POLYURETHANE AND PREPARATION METHOD THEREOF

TECHNICAL FIELD

The present disclosure relates to a waterborne polyurethane, and in particular to a waterborne polyurethane which can withstand high-temperature boiling and a preparation method thereof.

BACKGROUND

Flexible packaging materials are widely used in the food industry because of their high strength, good air tightness, good light-shielding properties, and heat sealability. The flexible packaging material is usually formed by laminating a plurality of flexible films using an adhesive. In order to bond different materials, an adhesive is required. The physical properties of the adhesive also have a considerable influence on the physical properties of the flexible packaging material. In particular, high adhesion strength is required when bonding different materials, and it is required that the final product be able to withstand environmental conditions marked by high temperatures and high humidity.

Because the solvent-based adhesive substantially conforms to the above physical properties, the adhesive used in flexible packaging material is currently dominated by a solvent-based adhesive. However, solvent-based adhesives have environmental issues due to poor operational safety and environmental pollution, and therefore, aqueous adhesives have been continuously developed in recent years.

Commercially available aqueous adhesives for packaging mainly include waterborne polyurethane and waterborne acrylic resin. However, waterborne acrylic resin adhesives have problems with poor bending resistance, resulting in limited applications, for example, they are unsuitable for use in flexible packaging materials. On the other hand, waterborne polyurethane adhesives are suitable for use in flexible packaging materials. However, it is difficult for waterborne polyurethane adhesives to meet the requirements of high-temperature boiling, thus greatly limiting their application.

Therefore, there is still a need in the art for waterborne polyurethane adhesives which can withstand high-temperature boiling.

SUMMARY

The embodiments of the present disclosure provide a waterborne polyurethane and its preparation method.

One embodiment of the present disclosure discloses a waterborne polyurethane. The waterborne polyurethane is formed by mixing a polyol, a diisocyanate, a dimethylol alkyl acid, and an epoxy resin into a mixture, and polymerizing the mixture. When the usage amount of the epoxy resin used is 1 part by weight, the usage amount of the polyol is 3 to 30 parts by weight, the usage amount of the diisocyanate is 1 to 10 parts by weight, and the usage amount of the dimethylol alkyl acid is 0.1-3.0 parts by weight. The epoxy resin includes an epoxy resin having a cyclic structure, a triacylglycerol having an epoxy group, or a combination thereof.

One embodiment of the present disclosure discloses a method for preparing a waterborne polyurethane. The method for preparing a waterborne polyurethane includes mixing a polyol, a diisocyanate, a dimethylol alkyl acid, and an epoxy resin into a mixture, and heating the mixture to carry out a prepolymerization reaction to form a prepolymer. After the prepolymerization reaction is complete, a neutralizing agent is added to the prepolymer to undergo a neutralization reaction. After the neutralization reaction is complete, water is added to the prepolymer and emulsified dispersion is carried out to obtain an emulsion of the prepolymer. Then, an aqueous solution of a chain extender is added to the emulsion of the prepolymer, and a chain elongation reaction is carried out to form an emulsion of the waterborne polyurethane. In the above-mentioned mixture, when the usage amount of the epoxy resin used is 1 part by weight, the usage amount of the polyol is 3 to 30 parts by weight, the usage amount of the diisocyanate is 1 to 10 parts by weight, and the usage amount of the dimethylol alkyl acid is 0.1-3.0 parts by weight. The epoxy resin includes an epoxy resin having a cyclic structure, a triacylglycerol having an epoxy group, or a combination thereof.

A detailed description is given in the following embodiments with reference to the accompanying drawings.

DETAILED DESCRIPTION

In the disclosure, the term "about" or "approximately" means in a range of 20% of a given value or range, preferably 10%, and more preferably 5%. In the disclosure, if there is no specific explanation, a given value or range means an approximate value which may imply the meaning of "about" or "approximately".

1 In accordance with some embodiments of the present disclosure, a waterborne polyurethane is provided. The waterborne polyurethane is formed by mixing a polyol, a diisocyanate, a dimethylol alkyl acid, and an epoxy resin into a mixture, and polymerizing the mixture. When the usage amount of the epoxy resin used is 1 part by weight, the usage amount of the polyol is 3 to 30 parts by weight, the usage amount of the diisocyanate is 1 to 10 parts by weight, and the usage amount of the dimethylol alkyl acid is 0.1-3.0 parts by weight. The epoxy resin includes an epoxy resin having a cyclic structure, a triacylglycerol having an epoxy group, or a combination thereof.

The polyol may include a polyester polyol, a polyether polyol, a plant polyol, or a combination thereof. In some embodiments, the polyester polyol is a condensation product of adipic acid and a polyol, and the polyol includes ethylene glycol, propylene glycol, butylene glycol, neopentyl glycol, 1,6-hexanediol, or a combination thereof. In some embodiments, the polyether polyol is polyethylene glycol, polypropylene glycol, poly(tetramethylene ether) glycol (PTMEG), or a combination thereof. In some embodiments, the polyester polyol is a condensation product of terephthalic acid (TPA) and 3-methyl-1,5-pentanediol (MPD).

The diisocyanate may include an aromatic diisocyanate, an aliphatic diisocyanate, an alicyclic diisocyanate, or a combination thereof. In some embodiments, the aromatic diisocyanate includes toluene diisocyanate, p-phenylene diisocyanate, 4,4'-diphenylmethane diisocyanate, p,p'-diphenyl diisocyanate, or a combination thereof. In some embodiments, the aliphatic diisocyanate includes hexamethylene diisocyanate or tetramethyl diisocyanate. In some embodiments, the alicyclic diisocyanate includes isophorone diisocyanate or cyclohexylmethane diisocyanate.

The dimethylolalkyl acid may include dimethylolpropionic acid or dimethylolbutanoic acid.

The epoxy resin may include an epoxy resin having a cyclic structure, a triacylglycerol having an epoxy group, or a combination thereof.

In some embodiments, the epoxy resin having a cyclic structure has a structure represented by Formula (I):

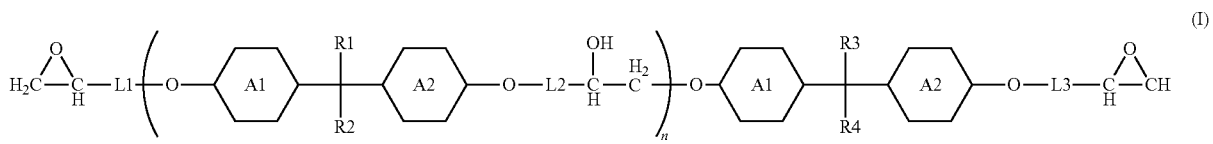

wherein each of R1, R2, R3, and R4 independently represents a hydrogen, a $C_1$-$C_6$ linear alkyl group, or a $C_1$-$C_6$ branched alkyl group;

each of A1, A2, A3, and A4 independently represents a divalent aromatic ring group or a divalent aliphatic ring group;

each of L1, L2, and L3 independently represents $—(CH_2)_p—$ or

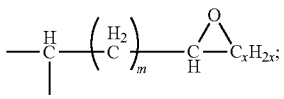

n is an integer in a range of 1-100;
p is an integer in a range of 1-20;
m is an integer in a range of 0-18; and
x is an integer in a range of 1-18.

In some embodiments, the triacylglycerol having an epoxy group has a structure represented by Formula (II):

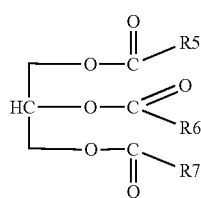

wherein each of R5, R6, and R7 independently represents a $C_1$-$C_{40}$ linear alkyl group, a $C_1$-$C_{40}$ branched alkyl group,

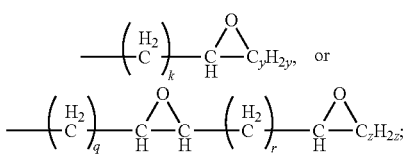

wherein at least one of R5, R6, and R7 represents

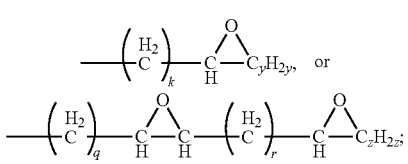

k is an integer in a range of 1-38;
q is an integer in a range of 1-35;
r is an integer in a range of 1-30;
y is an integer in a range of 1-35; and
z is an integer in a range of 1-30.

Commercially available products can also be used as the epoxy resin. For example, epoxy resins NPEL-128 and NPEF-170 manufactured by Nan Ya Plastics Co., Ltd. have the structure represented by the above Formula (I). Furthermore, the epoxy resin B-22 manufactured by Chang Chun Petrochemical Co., Ltd. has the structure represented by the above Formula (II).

In general, the packaging materials used in the food industry often require bactericidal treatment or sterilization (for example, high-temperature baking or boiling). However, the molecular chain of the general waterborne polyurethane may be thermally decomposed or hydrolyzed at a high temperature and a moisture-filled environment. When such a waterborne polyurethane is used as an adhesive, the adhesion of the adhesive is significantly lowered after the sterilization treatment.

In some embodiments of the present disclosure, a polyol, a diisocyanate, a dimethylol alkyl acid, and an epoxy resin are mixed into a raw material mixture prior to forming the polyurethane prepolymer. Thereafter, the raw material mixture undergoes a prepolymerization reaction and a subsequent polymerization reaction. Therefore, an epoxy group can be introduced into the molecular segment of the waterborne polyurethane. Furthermore, the epoxy group on one waterborne polyurethane molecule can be cross-linked with a functional group (for example, a hydroxyl group or an epoxy group) located on another waterborne polyurethane molecule. As a result, the waterborne polyurethane prepared by this method can have a three-dimensional network structure formed by a plurality of waterborne polyurethane molecules. Therefore, when such a waterborne polyurethane is used as an adhesive, the adhesion can be significantly improved.

On the other hand, when such a waterborne polyurethane packaging material is used in a high-temperature process (for example, sterilization treatment), the energy provided by the process may promote the crosslinking reaction of the waterborne polyurethane molecules. Therefore, the density of the three-dimensional network structure formed by the waterborne polyurethane molecules can be further improved. As a result, the adhesion after the high-temperature process can be improved. In other words, when such a waterborne polyurethane is used as an adhesive, the thermal stability (boiling resistance) of the adhesive can be significantly improved.

In some embodiments, the epoxy resin having a cyclic structure (for example, the epoxy resin having the structure represented by the above Formula (I)) has at least one epoxy group and at least one hydroxyl group. Both the epoxy group and the hydroxyl group can be cross-linked with the epoxy group located on the other molecule, and therefore, the positions at which the crosslinking reaction can be carried out between the different waterborne polyurethane molecules becomes more. In such an embodiment, the density of the three-dimensional network structure formed by the waterborne polyurethane molecules can be further increased. When such a waterborne polyurethane is used as an adhesive, the adhesion and thermal stability (boiling resistance) of the adhesive can be further improved.

If the epoxy groups in the epoxy resin raw material are too less, it may be difficult to form a desired three-dimensional network structure. Therefore, the adhesion of the adhesive is insufficient. If the epoxy groups in the epoxy resin raw material are too much, the viscosity of the waterborne polyurethane may be too high. Therefore, it is disadvantageous for the operation steps such as coating. In order to balance the adhesion and viscosity of the waterborne polyurethane, an epoxy resin having a moderate amount of epoxy groups may be used as the raw material for synthesizing the waterborne polyurethane. In the present specification, the amount of epoxy groups in the epoxy resin raw material is defined by "epoxy group equivalent $E_{epoxy}$".

In some embodiments, the epoxy resin as a raw material has an epoxy group equivalent $E_{epoxy}$ in a range of 150-3000 g/Eq. In other embodiments, the epoxy resin as a raw material has an epoxy group equivalent $E_{epoxy}$ of 300-2000 g/Eq. In still other embodiments, the epoxy resin as a raw material has an epoxy group equivalent $E_{epoxy}$ of 500-1000 g/Eq.

If the amount of isocyanate groups in the diisocyanate raw material does not match the amount of hydroxyl groups in the polyol raw material, it is difficult to impart suitable physical properties to the synthesized waterborne polyurethane. Furthermore, if the amount of isocyanate groups in the diisocyanate raw material does not match the amount of epoxy groups in the epoxy resin raw material, it is also difficult to impart suitable physical properties to the synthesized waterborne polyurethane. In the present specification, the amount of isocyanate groups in the diisocyanate raw material is defined by "isocyanate group equivalent $E_{NCO}$". Furthermore, the amount of hydroxyl groups in the polyol raw material is defined by "hydroxyl group equivalent $E_{OH}$".

In some embodiments, the diisocyanate has an isocyanate group equivalent $E_{NCO}$, the polyol has a hydroxyl group equivalent Eon, and the ratio $E_{NCO}/E_{OH}$ of the isocyanate group equivalent $E_{NCO}$ to the hydroxyl group equivalent Eon is in a range of 1.1-2.0. In other embodiments, the ratio $E_{NCO}/E_{OH}$ of the isocyanate group equivalent $E_{NCO}$ to the hydroxyl group equivalent $E_{OH}$ is in a range of 1.2-1.8. In still other embodiments, the ratio $E_{NCO}/E_{OH}$ of the isocyanate group equivalent $E_{NCO}$ to the hydroxyl group equivalent Eon is in a range of 1.3-1.6.

In some embodiments, the ratio $E_{NCO}/E_{epoxy}$ of the isocyanate group equivalent $E_{NCO}$ to the epoxy group equivalent $E_{epoxy}$ is in a range of 0.5-3.0. In other embodiments, the ratio $E_{NCO}/E_{epoxy}$ of the isocyanate group equivalent $E_{NCO}$ to the epoxy group equivalent $E_{epoxy}$ is in a range of 1.0-2.5. In still other embodiments, the ratio $E_{NCO}/E_{epoxy}$ of the isocyanate group equivalent $E_{NCO}$ to the epoxy group equivalent $E_{epoxy}$ is in a range of 1.5-2.0.

If the epoxy resin having a suitable molecular weight is selected as a raw material, the synthesis reaction can be easily carried out, and the waterborne polyurethane having suitable physical properties can be obtained. In some embodiments, the epoxy resin has a weight average molecular weight (Mw) in a range of 500-50,000. In other embodiments, the epoxy resin has a weight average molecular weight (Mw) in a range of 2,000-20,000. In still other embodiments, the epoxy resin has a weight average molecular weight (Mw) in a range of 5,000-10,000.

If the polyol having a suitable molecular weight is selected as a raw material, the synthesis reaction can be easily carried out, and the waterborne polyurethane having suitable physical properties can be obtained. In some embodiments, the polyol has a weight average molecular weight (Mw) in a range of 200-5,000. In other embodiments, the polyol has a weight average molecular weight (Mw) in a range of 500-4,000. In still other embodiments, the polyol has a weight average molecular weight (Mw) in a range of 1,000-3,000.

In accordance with some embodiments of the present disclosure, a method for preparing a waterborne polyurethane is provided. The method for preparing a waterborne polyurethane includes mixing a polyol, a diisocyanate, a dimethylol alkyl acid, and an epoxy resin into a mixture, and heating the mixture to carry out a prepolymerization reaction to form a prepolymer. After the prepolymerization reaction is complete, a neutralizing agent is added to the prepolymer to undergo a neutralization reaction. After the neutralization reaction is complete, water is added to the prepolymer and emulsified dispersion is carried out to obtain an emulsion of the prepolymer. Then, an aqueous solution of a chain extender is added to the emulsion of the prepolymer, and a chain elongation reaction is carried out to form an emulsion of the waterborne polyurethane.

In the above-mentioned mixture, when the usage amount of the epoxy resin used is 1 part by weight, the usage amount of the polyol is 3 to 30 parts by weight, the usage amount of the diisocyanate is 1 to 10 parts by weight, and the usage amount of the dimethylol alkyl acid is 0.1-3.0 parts by weight. The epoxy resin includes an epoxy resin having a cyclic structure, a triacylglycerol having an epoxy group, or a combination thereof.

In some embodiments, the above-mentioned prepolymerization reaction has a reaction temperature in a range of 70-90° C., and the prepolymerization reaction has a reaction duration in a range of 2-5 hours.

In general, in order to improve the adhesion of the waterborne polyurethane, a crosslinking agent is additionally added to the emulsion of the polyurethane. However, this additional added crosslinking agent may cause the waterborne polyurethane to coagulate into a lump or a jelly so that the waterborne polyurethane cannot be coated and used. Furthermore, the addition of the crosslinking agent requires an additional process and may require modifications or additions to the process equipment. This will not be conducive to simplifying the process and reducing production costs. In the preparation method provided in the embodiments of the present disclosure, the epoxy resin is used as one of raw materials for the prepolymerization reaction. As a result, the synthesized waterborne polyurethane has an epoxy group which can undergo a crosslinking reaction, and it can form a three-dimensional network structure having a high density. Therefore, the physical properties (for example, adhesion) of the waterborne polyurethane can be significantly improved.

Furthermore, after the sterilization treatment, the molecular chain of the waterborne polyurethane to which the crosslinking agent is additionally added may still be thermally decomposed or hydrolyzed. That is, after the sterilization treatment, the adhesion of the adhesive may be significantly lowered. In contrast, the waterborne polyurethane provided in the embodiments of the present disclosure has an epoxy group. In a subsequent high-temperature process, the epoxy group in the waterborne polyurethane can be further crosslinked with a functional group located on another waterborne polyurethane molecule. Therefore, after the sterilization treatment, good adhesion can be maintained. That is, the thermal stability (boiling resistance) of the adhesive can be significantly improved.

In the following, a few examples are given to illustrate the waterborne polyurethane and the method for preparing the waterborne polyurethane of the present disclosure. The details of the components used in the Preparation Examples are shown below.

Polyether polyol: manufactured by Covestro Co., Ltd.; product number: AL-1021; weight average molecular weight (Mw): 2000.

Polyester polyol (I): manufactured by Kuraray Polyols Co., Ltd.; product number: P2020; weight average molecular weight (Mw): 2000.

Polyester polyol (II): manufactured by Yong Shun Chemical Co., Ltd.; product number: AR-U2420; weight average molecular weight (Mw): 2000.

Epoxy resin (I): manufactured by Nan Ya Plastics Co., Ltd.; product number: NPEL-128.

Epoxy resin (II): manufactured by Nan Ya Plastics Co., Ltd.; product number: NPEF-170.

Epoxy resin (III): manufactured by Chang Chun Petrochemical Co., Ltd.; product number: B-22.

Isophorone diisocyanate: manufactured by Acros Co., Ltd.; purity: 98%; CAS No.: 4098-71-9.

4,4-dicyclohexylmethane diisocyanate: manufactured by TCI Co., Ltd.; purity: 90%; CAS No.: 5124-30-1.

Neutralizing agent: triethylamine; manufactured by TEDIA Co., Ltd.; purity: 99%; CAS No.: 121-44-8.

Chain extender: ethylenediamine; manufactured by TEDIA Co., Ltd.; purity 99.5%; CAS No.: 107-15-3.

Dimethylolbutanoic acid: manufactured by TCI Co., Ltd.; purity: 97%; CAS No.: 10097-02-6.

Aqueous crosslinking agent: manufactured by Lidye Chemical Co., Ltd.; product number: WUK-9210; purity: 99%.

Preparation Example 1

62.86 parts by weight of the polyether polyol, 5.58 parts by weight of the polyester polyol (I), 16.06 parts by weight of the polyester polyol (II), and 4.78 parts by weight of dimethylolbutanoic acid were dissolved and mixed. Thereafter, 5.38 parts by weight of the epoxy resin (I) was added and mixed, and then, 19.77 parts by weight of isophorone diisocyanate and 0.011 parts by weight of a catalyst (dibutyltin dilaurate, T12) were added and uniformly stirred to form a raw material mixture. The raw material mixture was heated and maintained at 80° C., and it underwent the prepolymerization reaction for about 2-3 hours. The measurement was carried out in accordance with ASTM D1638 to confirm the degree of reaction of the prepolymerization reaction. When the prepolymerization was completed, 3.32 parts by weight of triethylamine was added at 60° C. to carry out a neutralization reaction. After the neutralization reaction was completed, 200.8 parts by weight of water was added to the prepolymer for emulsified dispersion to obtain an emulsion of the prepolymer. 1 part by weight of ethylenediamine was added to about 5 parts by weight of water to obtain a diluted ethylenediamine solution. The diluted ethylenediamine solution was slowly added to the emulsion of the prepolymer while stirring was continued. Then, after continuously stirring for about 1-2 hours, the waterborne polyurethane emulsion (A) was obtained.

Preparation Example 2

52.18 parts by weight of the polyether polyol and 3.36 parts by weight of dimethylolbutanoic acid were dissolved and mixed. Thereafter, 10.22 parts by weight of the epoxy resin (I) was added and mixed, and then, 12.15 parts by weight of isophorone diisocyanate and 0.044 parts by weight of a catalyst (dibutyltin dilaurate, T12) were added and uniformly stirred to form a raw material mixture. The raw material mixture was heated and maintained at 80° C., and it underwent the prepolymerization reaction for about 2-3 hours. The measurement was carried out in accordance with ASTM D1638 to confirm the degree of reaction of the prepolymerization reaction. When the prepolymerization reaction was completed, 2.3 parts by weight of triethylamine was added at 60° C. to carry out a neutralization reaction. After the neutralization reaction was completed, 97.88 parts by weight of water was added to the prepolymer for emulsified dispersion to obtain an emulsion of the prepolymer. 1 part by weight of ethylenediamine was added to about 5 parts by weight of water to obtain a diluted ethylenediamine solution. The diluted ethylenediamine solution was slowly added to the emulsion of the prepolymer while stirring was continued. Then, after continuously stirring for about 1-2 hours, the waterborne polyurethane emulsion (B) was obtained.

Preparation Example 3

51.32 parts by weight of the polyester polyol (II) and 3.28 parts by weight of dimethylolbutanoic acid were dissolved and mixed. Thereafter, 9.53 parts by weight of the epoxy resin (I) was added and mixed, and then, 10.97 parts by weight of isophorone diisocyanate and 0.064 parts by weight of a catalyst (dibutyltin dilaurate, T12) were added and uniformly stirred to form a raw material mixture. The raw material mixture was heated and maintained at 80° C., and it underwent the prepolymerization reaction for about 2-3 hours. The measurement was carried out in accordance with ASTM D1638 to confirm the degree of reaction of the prepolymerization reaction. When the prepolymerization reaction was completed, 2.22 parts by weight of triethylamine was added at 60° C. to carry out a neutralization reaction. After the neutralization reaction was completed, 127.06 parts by weight of water was added to the prepolymer for emulsified dispersion to obtain an emulsion of the prepolymer. 1 part by weight of ethylenediamine was added to about 5 parts by weight of water to obtain a diluted ethylenediamine solution. The diluted ethylenediamine solution was slowly added to the emulsion of the prepolymer while stirring was continued. Then, after continuously stirring for about 1-2 hours, the waterborne polyurethane emulsion (C) was obtained.

Preparation Example 4

59.65 parts by weight of the polyether polyol, 20.02 parts by weight of the polyester polyol (II), and 4.56 parts by weight of dimethylolbutanoic acid were dissolved and mixed. Thereafter, 5.14 parts by weight of the epoxy resin (II) was added and mixed, and then, 18.75 parts by weight of isophorone diisocyanate and 0.074 parts by weight of a catalyst (dibutyltin dilaurate, T12) were added and uniformly stirred to form a raw material mixture. The raw material mixture was heated and maintained at 80° C., and it underwent the prepolymerization reaction for about 2-3 hours. The measurement was carried out in accordance with ASTM D1638 to confirm the degree of reaction of the prepolymerization reaction. When the prepolymerization reaction was completed, 3.13 parts by weight of triethylamine was added at 60° C. to carry out a neutralization reaction. After the neutralization reaction was completed, 233.64 parts by weight of water was added to the prepolymer for emulsified dispersion to obtain an emulsion of the prepolymer. 1 part by weight of ethylenediamine was added to about 5 parts by weight of water to obtain a diluted ethylenediamine solution. The diluted ethylenediamine solution was slowly added to the emulsion of the prepolymer while stirring was continued. Then, after continuously stirring for about 1-2 hours, the waterborne polyurethane emulsion (D) was obtained.

Preparation Example 5

100.79 parts by weight of the polyether polyol and 7.28 parts by weight of dimethylolbutanoic acid were dissolved and mixed. Thereafter, 18.60 parts by weight of the epoxy resin (III) was added and mixed, and then, 37.67 parts of 4,4-dicyclohexylmethane diisocyanate and 0.01 parts by weight of a catalyst (dibutyltin dilaurate, T12) were added and uniformly stirred to form a raw material mixture. The raw material mixture was heated and maintained at 80° C., and it underwent the prepolymerization reaction for about 2-3 hours. The measurement was carried out in accordance with ASTM D1638 to confirm the degree of reaction of the prepolymerization reaction. When the prepolymerization reaction was completed, 4.9 parts by weight of triethylamine was added at 60° C. to carry out a neutralization reaction. After the neutralization reaction was completed, 301.05 parts by weight of water was added to the prepolymer for emulsified dispersion to obtain an emulsion of the prepolymer. 1 part by weight of ethylenediamine was added to about 5 parts by weight of water to obtain a diluted ethylenediamine solution. The diluted ethylenediamine solution was slowly added to the emulsion of the prepolymer while stirring was continued. Then, after continuously stirring for about 1-2 hours, the waterborne polyurethane emulsion (E) was obtained.

Comparative Preparation Example 1

202.8 parts by weight of the polyether polyol and 9.49 parts by weight of dimethylolbutanoic acid were dissolved and mixed. Thereafter, 44.1 parts by weight of isophorone diisocyanate and 0.26 parts by weight of a catalyst (dibutyltin dilaurate, T12) were added and uniformly stirred to form a raw material mixture. The raw material mixture was heated and maintained at 80° C., and it underwent the prepolymerization reaction for about 2-3 hours. The measurement was carried out in accordance with ASTM D1638 to confirm the degree of reaction of the prepolymerization reaction. When the prepolymerization reaction was completed, 6.48 parts by weight of triethylamine was added at 60° C. to carry out a neutralization reaction. After the neutralization reaction was completed, 377.9 parts by weight of water was added to the prepolymer for emulsified dispersion to obtain an emulsion of the prepolymer. 1 part by weight of ethylenediamine was added to about 5 parts by weight of water to obtain a diluted ethylenediamine solution. The diluted ethylenediamine solution was slowly added to the emulsion of the prepolymer while stirring was continued. Then, after continuously stirring for about 1-2 hours, the waterborne polyurethane emulsion (F) was obtained.

Comparative Preparation Example 2

2 parts by weight of the aqueous crosslinking agent was added to 98 parts by weight of the waterborne polyurethane emulsion (F) prepared in Comparative Preparation Example 1, and the waterborne polyurethane emulsion (G) was obtained.

[Measurement of Peel Strength]

The waterborne polyurethane emulsion (A) prepared in Preparation Example 1 was coated on a polyethylene terephthalate (PET) substrate by using a coating frame having a thickness of 60 μm, and the emulsion was dried at 100° C. Thereafter, the substrate coated with the waterborne polyurethane emulsion was attached to another polyethylene terephthalate substrate by using a temperature-controllable laminator to obtain a test sheet for measuring the peel strength. Then, the test sheet was cut into test samples having a width of 1.5 cm. The T-type tensile test was carried out at a speed of 20 cm/min, and the measured peel strength was shown in Table 1. In Table 1, the unit of peel strength is g/15 mm. The temperature for attaching substrate was set to room temperature (25° C.), 80° C., 100° C., and 120° C., respectively.

TABLE 1

| Attaching temperature | Peel strength |
| --- | --- |
| room temperature | 350 |
| 80° C. | 500 |
| 100° C. | PET printing substrate fractured |
| 120° C. | PET printing substrate fractured |

Example 1

The waterborne polyurethane emulsion (A) prepared in Preparation Example 1 was used as an adhesive, and the peel strength (S1) was measured in accordance with the above method. When the peel strength (S1) was measured, the temperature for attaching substrate was set to 80° C. The measured peel strength (S1) is shown in Table 2.

[Measurement of Peel Strength after Sterilization]

The above test sample for the measurement of peel strength was placed in an autoclave under a non-sealing condition. The sterilization operation was carried out at 121° C. and 1 atm for 30 minutes. Thereafter, the test sample was taken out and cooled to room temperature (25° C.). Then, the boiled test sample was subjected to measurement of the peel strength as described above. The measured peel strength after boiling sterilization (S2) is shown in Table 2.

Examples 2-5, Comparative Examples 1-3

In Examples 2-5, the waterborne polyurethane emulsions (B)-(E) prepared in Preparation Examples 2-5 were respectively used as an adhesive, and the peel strength (S1) and the peel strength (S2) after boiling sterilization were measured according to the above methods.

In Comparative Examples 1 and 2, the waterborne polyurethane emulsions (F) and (G) prepared in Comparative Preparation Examples 1 and 2 were respectively used as an adhesive, and the peel strength (S1) and the peel strength (S2) after boiling sterilization were measured according to the above methods.

In Comparative Example 3, the peel strength (S1) and the peel strength (S2) after cooking were measured using a commercially available waterborne polyurethane adhesive (manufactured by Bayer Co., Ltd.; product number: Bayer U XP2643).

The experimental results of the Examples and Comparative Examples are shown in Table 2. In Table 2, if the peel strength S1 is greater, it indicates that the adhesion of the waterborne polyurethane adhesive is better. If the peel strength S2 after boiling sterilization is larger, it indicates that the adhesion of the waterborne polyurethane adhesive after boiling sterilization is better. The ratio (that is, (S1−S2)/S1) of the difference (S1−S2) between the peel strength S1 and the peel strength S2 after boiling sterilization relative to the peel strength S1 may represent the rate of decrease in the peel strength. If the rate of decrease (unit: %) in the peel strength is smaller, it indicates that the boiling resistance of the waterborne polyurethane adhesive is better.

TABLE 2

|  | Amount of crosslinking agent (wt %) | Peel strength S1 (g/15 mm) | Peel strength after boiling sterilization S2 (g/15 mm) | Rate of decrease in the peel strength (%) |
| --- | --- | --- | --- | --- |
| Example 1 | 0 | 500 | 600 | −20 |
| Example 2 | 0 | 500 | 550 | −10 |
| Example 3 | 0 | 700 | 350 | 50 |
| Example 4 | 0 | 750 | 650 | 14 |
| Comparative Example 1 | 0 | 100 | 30 | 70 |
| Comparative Example 2 | 2 | 150 | 30 | 80 |
| Comparative Example 3 | 0 | 500 | 30 | 94 |

Referring to Example 1 and Comparative Example 1 of Table 2, in Example 1, the starting material for the prepolymerization reaction included epoxy resin (I). On the other hands, in Comparative Example 1, the starting material of the prepolymerization did not include an epoxy resin. The peel strength S1 of the waterborne polyurethane adhesive of Example 1 was 500 g/15 mm, and the peel strength S1 of the waterborne polyurethane adhesive of Comparative Example 1 was 100 g/15 mm. Furthermore, in Examples 2-4, the starting materials for the prepolymerization included epoxy resin (I), epoxy resin (II) or epoxy resin (III), respectively. The peel strengths S1 of the waterborne polyurethane adhesive of Examples 2-4 were all greater than or equal to 500 g/15 mm. In Comparative Example 2, the starting material of the prepolymerization did not include an epoxy resin, and an additional crosslinking agent was added to the emulsion of the prepolymer. The peel strength S1 of the waterborne polyurethane adhesive of Comparative Example 2 was 150 g/15 mm. It can be confirmed that the waterborne polyurethane adhesive in the embodiments of the present disclosure can significantly improve the adhesion.

Referring to Examples 1-4 and Comparative Example 3 of Table 2, the peel strength S1 of the waterborne polyurethane adhesive of Comparative Example 3 was 500 g/15 mm. The peel strengths S1 of the waterborne polyurethane adhesive of Examples 2-4 were all greater than or equal to 500 g/15 mm. It can be confirmed that the adhesion of the waterborne polyurethane adhesive in the embodiments of the present disclosure can be the same as or better than the adhesion of a commercially available product.

Referring to Comparative Examples 1-3 of Table 2, after the boiling sterilization, the peel strengths S2 of the waterborne polyurethane adhesive of Comparative Examples 1-3 were 30 g/15 mm. Such peel strength has not been able to meet the needs of practical applications. In other words, when the waterborne polyurethane adhesive of Comparative Examples 1-3 is applied to a packaging material, the packaging material will be delaminated after boiling sterilization.

In contrast, referring to Examples 1-4 of Table 2, the peel strengths S2 of Examples 1-4 were 600 g/15 mm, 550 g/15 mm, 350 g/15 mm, and 650 g/15 mm, respectively. In other words, the waterborne polyurethane adhesive of Examples 1-4 maintained suitable peel strength even after boiling sterilization. It can be confirmed that when the waterborne polyurethane adhesive in the embodiments of the present disclosure is applied to packaging material, the packaging material can withstand boiling sterilization without problems such as delamination.

Referring to Comparative Examples 1-3 of Table 2, the rates of decrease in the peel strength of Comparative Examples 1-3 were 70%, 80%, and 94%, respectively. In particular, although the waterborne polyurethane adhesive of Comparative Example 3 had sufficient peel strength S1, the peel strength S2 of the waterborne polyurethane adhesive of Comparative Example 3 was only about 6% of the peel strength S1. In other words, the waterborne polyurethane adhesive of Comparative Example 3 has very poor boiling resistance and is difficult to apply to the field of food packaging materials requiring boiling sterilization.

In contrast, referring to Examples 1-4 of Table 2, the rates of decrease in the peel strength of Examples 1-4 were −20%, −10%, 50%, and 14%, respectively. Even after the boiling sterilization, the peel strength S2 of the waterborne polyurethane adhesive of Examples 1-4 can maintain 50% or more of the peel strength S1. In particular, the rates of decrease in the peel strength of Examples 1 and 2 were negative. It indicates that the adhesion of the waterborne polyurethane adhesives of Examples 1 and 2 was not lowered but was improved after the boiling sterilization. It can be confirmed that the waterborne polyurethane adhesive in the embodiments of the present disclosure has excellent boiling resistance, and thus can be suitably used in the field of food packaging materials requiring boiling sterilization.

In summary, the waterborne polyurethane provided by the embodiments of the present disclosure introduces an epoxy group into the molecular structure of the polyurethane to form a high-density three-dimensional network structure. As a result, the properties of the waterborne polyurethane adhesive such as adhesion, heat resistance and boiling resistance can be significantly improved. The packaging material using the waterborne polyurethane adhesive of the embodiments of the present disclosure can maintain good physical properties even after boiling sterilization at 121° C. without causing delamination. Furthermore, the waterborne polyurethane adhesive of the embodiments of the present disclosure has the advantages of better bending resistance, better operation safety, and less environmental impact. Therefore, the waterborne polyurethane of the embodiments of the present disclosure can be applied to the field of food packaging materials requiring boiling sterilization treatment. In addition, the method for preparing the waterborne polyurethane provided by the embodiments of the present disclosure does not include an additional step. Therefore, it can be easily integrated into existing processes without affecting the time and cost required for production.

Although the disclosure has been described by way of example and in terms of the preferred embodiments, it should be understood that various modifications and similar arrangements (as would be apparent to those skilled in the art) can be made herein without departing from the spirit and scope of the disclosure as defined by the appended claims.

What is claimed is:

1. A waterborne polyurethane, wherein the waterborne polyurethane is formed by mixing a polyol, a diisocyanate, a dimethylol alkyl acid, and an epoxy resin into a mixture, and polymerizing the mixture;
wherein when the usage amount of the epoxy resin used is 1 part by weight, the usage amount of the polyol is 3 to 30 parts by weight, the usage amount of the diisocyanate is 1 to 10 parts by weight, and the usage amount of the dimethylol alkyl acid is 0.1-3.0 parts by weight; and
wherein the epoxy resin comprises an epoxy resin having a cyclic structure, a triacylglycerol having an epoxy group, or a combination thereof.

2. The waterborne polyurethane as claimed in claim 1, wherein the epoxy resin has an epoxy group equivalent $E_{epoxy}$ in a range of 150-3000 g/Eq.

3. The waterborne polyurethane as claimed in claim 1, wherein the diisocyanate has an isocyanate group equivalent $E_{NCO}$, the polyol has a hydroxyl group equivalent $E_{OH}$, and the ratio $E_{NCO}/E_{OH}$ of the isocyanate group equivalent $E_{NCO}$ to the hydroxyl group equivalent $E_{OH}$ is in a range of 1.1-2.0.

4. The waterborne polyurethane as claimed in claim 1, wherein the diisocyanate has an isocyanate group equivalent $E_{NCO}$, the epoxy resin has an epoxy group equivalent $E_{epoxy}$, and the ratio $E_{NCO}/E_{epoxy}$ of the isocyanate group equivalent $E_{NCO}$ to the epoxy group equivalent $E_{epoxy}$ is in a range of 0.5-3.0.

5. The waterborne polyurethane as claimed in claim 1, wherein the diisocyanate comprises an aromatic diisocyanate, an aliphatic diisocyanate, an alicyclic diisocyanate, or a combination thereof.

6. The waterborne polyurethane as claimed in claim 1, wherein the aromatic diisocyanate comprises toluene diisocyanate, p-phenylene diisocyanate, 4,4'-diphenylmethane diisocyanate, p,p'-diphenyl diisocyanate, or a combination thereof.

7. The waterborne polyurethane as claimed in claim 1, wherein the polyol comprises a polyester polyol, a polyether polyol, a plant polyol, or a combination thereof.

8. The waterborne polyurethane as claimed in claim 1, wherein the epoxy resin having a cyclic structure has at least one epoxy group and at least one hydroxyl group.

9. The waterborne polyurethane as claimed in claim 8, wherein the epoxy resin having a cyclic structure has a structure represented by Formula (I):

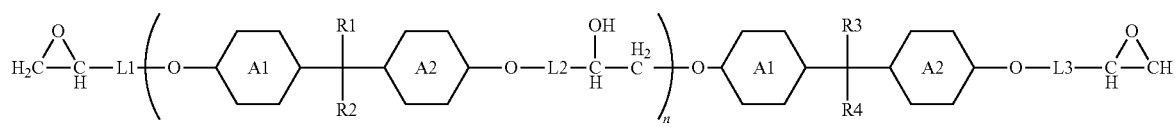

wherein
each of R1, R2, R3, and R4 independently represents a hydrogen, a $C_1$-$C_6$ linear alkyl group, or a $C_1$-$C_6$ branched alkyl group;
each of A1, A2, A3, and A4 independently represents a divalent aromatic ring group or a divalent aliphatic ring group;
each of L1, L2, and L3 independently represents $-(CH_2)_p-$ or

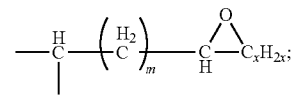

n is an integer in a range of 1-100;
p is an integer in a range of 1-20;
m is an integer in a range of 0-18; and
x is an integer in a range of 1-18.

10. The waterborne polyurethane as claimed in claim 1, wherein the triacylglycerol having an epoxy group has a structure represented by Formula (II):

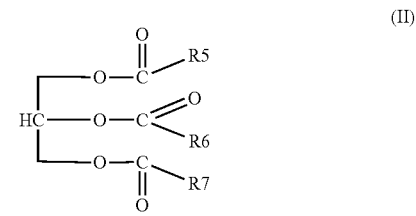

wherein
each of R5, R6, and R7 independently represents a $C_1$-$C_{40}$ linear alkyl group, a $C_1$-$C_{40}$ branched alkyl group,

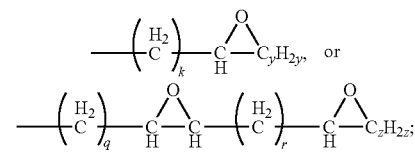

wherein at least one of R5, R6, and R7 represents

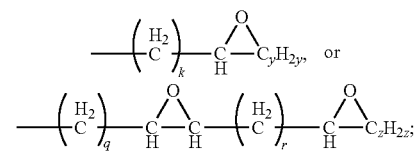

k is an integer in a range of 1-38;
q is an integer in a range of 1-35;
r is an integer in a range of 1-30;
y is an integer in a range of 1-35; and
z is an integer in a range of 1-30.

11. A method for preparing a waterborne polyurethane, comprising:
mixing a polyol, a diisocyanate, a dimethylol alkyl acid, and an epoxy resin into a mixture, and heating the mixture to carry out a prepolymerization reaction to form a prepolymer, wherein when the usage amount of the epoxy resin used is 1 part by weight, the usage amount of the polyol is 3 to 30 parts by weight, the usage amount of the diisocyanate is 1 to 10 parts by weight, and the usage amount of the dimethylol alkyl acid is 0.1-3.0 parts by weight, and wherein the epoxy resin comprises an epoxy resin having a cyclic structure, a triacylglycerol having an epoxy group, or a combination thereof;

adding a neutralizing agent to the prepolymer to carry out a neutralization reaction;

adding water to the prepolymer and performing an emulsified dispersion to obtain an emulsion of the prepolymer;

adding an aqueous solution of a chain extender to the emulsion of the prepolymer, and a chain elongation reaction is carried out to form an emulsion of the waterborne polyurethane.

12. The method for preparing the waterborne polyurethane as claimed in claim 11, wherein the prepolymerization reaction has a reaction temperature in a range of 70-90° C., and the prepolymerization reaction has a reaction duration in a range of 2-5 hours.

* * * * *